US011622346B2

(12) United States Patent
Akkarakaran et al.

(10) Patent No.: US 11,622,346 B2
(45) Date of Patent: Apr. 4, 2023

(54) CODE BLOCK GROUP-BASED TRANSMISSION

(71) Applicant: QUALCOMM Incorporated, San Diego, CA (US)

(72) Inventors: Sony Akkarakaran, Poway, CA (US); Tao Luo, San Diego, CA (US); Gabi Sarkis, San Diego, CA (US); Junyi Li, Franklin Park, NJ (US); Jung Ho Ryu, Fort Lee, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/191,359

(22) Filed: Mar. 3, 2021

(65) Prior Publication Data

US 2021/0321389 A1 Oct. 14, 2021

Related U.S. Application Data

(60) Provisional application No. 63/009,204, filed on Apr. 13, 2020.

(51) Int. Cl.
*H04W 72/04* (2009.01)
*H04W 56/00* (2009.01)
*H04L 1/00* (2006.01)
*H04W 40/22* (2009.01)

(52) U.S. Cl.
CPC ....... *H04W 72/0413* (2013.01); *H04L 1/0061* (2013.01); *H04W 40/22* (2013.01); *H04W 56/001* (2013.01)

(58) Field of Classification Search
None
See application file for complete search history.

(56) References Cited

U.S. PATENT DOCUMENTS

| 2018/0269898 | A1* | 9/2018 | Sun ........................ H04L 1/1893 |
| 2018/0270022 | A1* | 9/2018 | Sun ........................ H04L 1/1896 |
| 2020/0067667 | A1* | 2/2020 | Gou ....................... H04L 1/1887 |
| 2020/0259600 | A1* | 8/2020 | Cao ...................... H04W 72/1289 |

\* cited by examiner

*Primary Examiner* — Walter J Divito
(74) *Attorney, Agent, or Firm* — Harrity & Harrity, LLP

(57) ABSTRACT

Various aspects of the present disclosure generally relate to wireless communication. In some aspects, a wireless communication device may transmit, to a receiving device, an identification of a subset of code block groups (CBGs) of a set of CBGs, wherein the set of CBGs comprises a transport block; and transmit, to the receiving device, an initial data transmission comprising the subset of CBGs. Numerous other aspects are provided.

30 Claims, 10 Drawing Sheets

CODE BLOCK GROUP-BASED TRANSMISSION

CROSS-REFERENCE TO RELATED APPLICATION

This patent application claims priority to U.S. Provisional Patent Application No. 63/009,204, filed on Apr. 13, 2020, entitled "CODE BLOCK GROUP-BASED TRANSMISSION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for code block group-based transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless communication device, may include transmitting, to a receiving device, an identification of a subset of code block groups (CBGs) of a set of CBGs, wherein the set of CBGs comprises a transport block (TB); and transmitting, to the receiving device, an initial data transmission comprising the subset of CBGs.

In some aspects, a method of wireless communication, performed by a wireless communication device, may include receiving, from a transmitting device, an identification of a subset of CBGs of a set of CBGs, wherein the set of CBGs comprises a TB; and receiving, from the transmitting device, an initial data transmission comprising the subset of CBGs.

In some aspects, a wireless communication device for wireless communication may include a memory and one or more processors operatively coupled to the memory. The memory and the one or more processors may be configured to transmit, to a receiving device, an identification of a subset of CBGs of a set of CBGs, wherein the set of CBGs comprises a TB; and transmit, to the receiving device, an initial data transmission comprising the subset of CBGs.

In some aspects, a wireless communication device for wireless communication may include a memory and one or more processors operatively coupled to the memory. The memory and the one or more processors may be configured to receive, from a transmitting device, an identification of a subset of CBGs of a set of CBGs, wherein the set of CBGs comprises a TB; and receive, from the transmitting device, an initial data transmission comprising the subset of CBGs.

In some aspects, a non-transitory computer-readable medium may store one or more instructions for wireless communication. The one or more instructions, when executed by one or more processors of a wireless communication device, may cause the one or more processors to transmit, to a receiving device, an identification of a subset of CBGs of a set of CBGs, wherein the set of CBGs comprises a TB; and transmit, to the receiving device, an initial data transmission comprising the subset of CBGs.

In some aspects, a non-transitory computer-readable medium may store one or more instructions for wireless communication. The one or more instructions, when executed by one or more processors of a wireless communication device, may cause the one or more processors to receive, from a transmitting device, an identification of a subset of CBGs of a set of CBGs, wherein the set of CBGs comprises a TB; and receive, from the transmitting device, an initial data transmission comprising the subset of CBGs.

In some aspects, an apparatus for wireless communication may include means for transmitting, to a receiving device, an identification of a subset of CBGs of a set of CBGs, wherein the set of CBGs comprises TB; and means for transmitting, to the receiving device, an initial data transmission comprising the subset of CBGs.

In some aspects, an apparatus for wireless communication may include means for receiving, from a transmitting device, an identification of a subset of CBGs of a set of CBGs, wherein the set of CBGs comprises a TB; and means for receiving, from the transmitting device, an initial data transmission comprising the subset of CBGs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
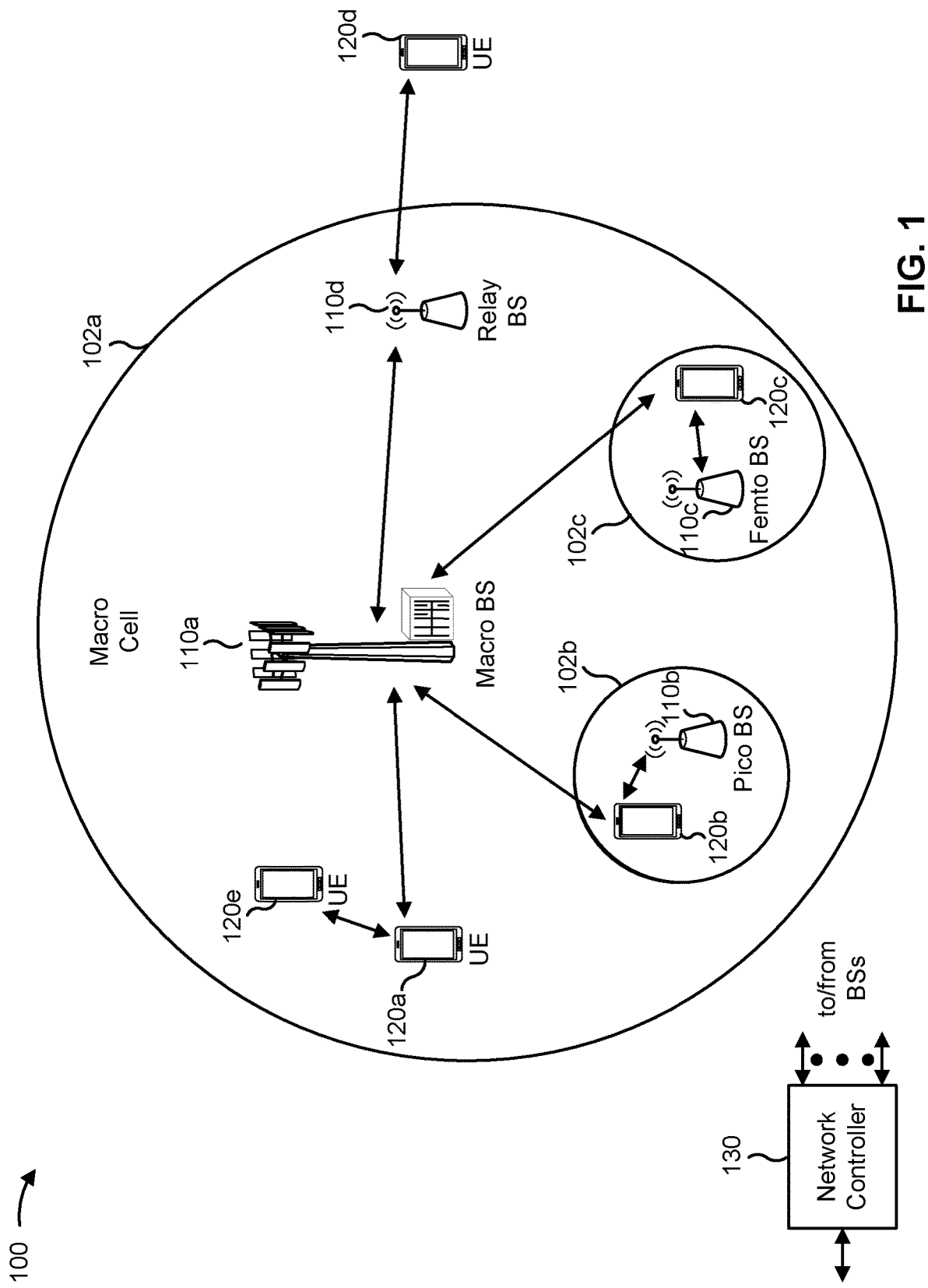
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
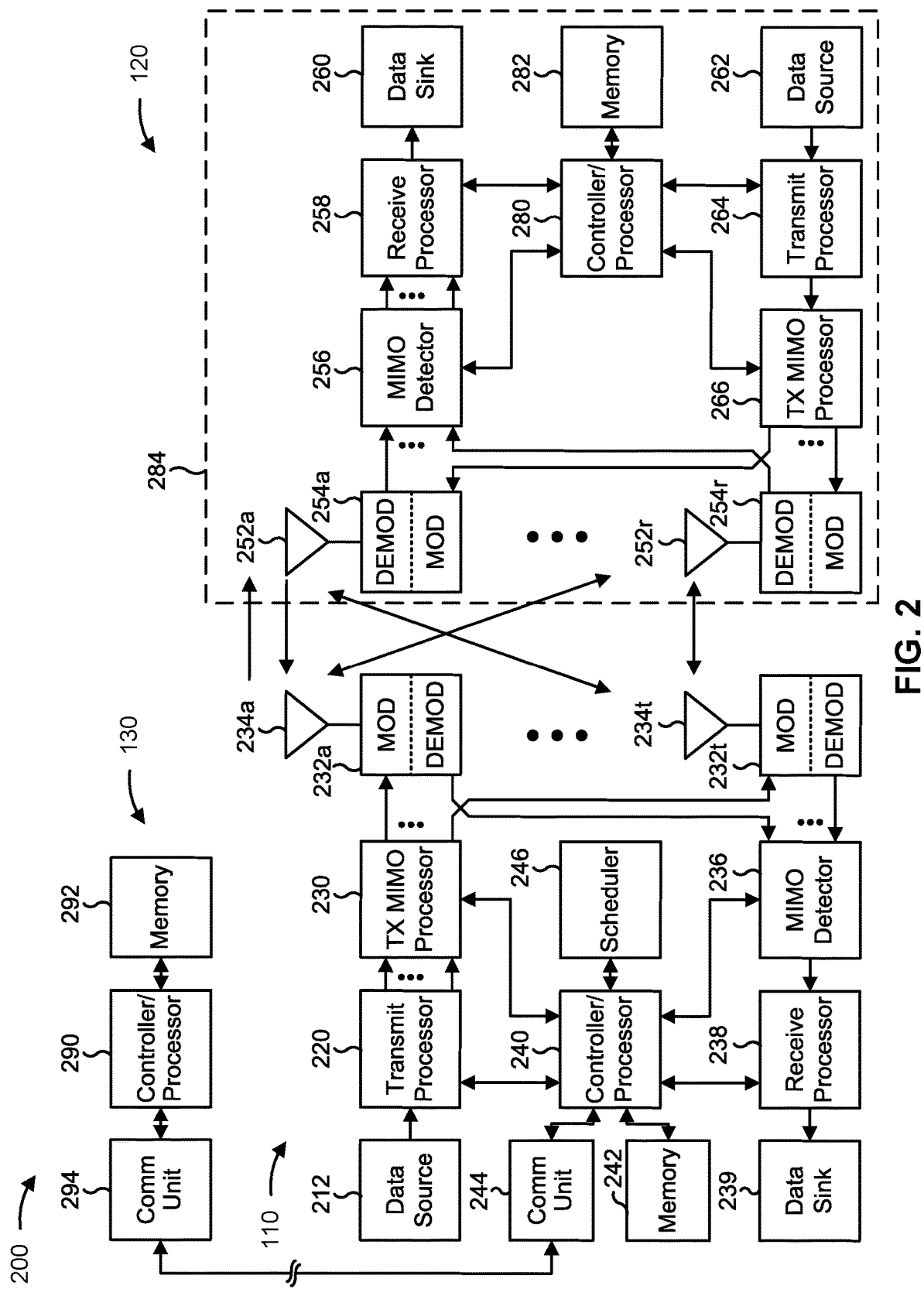
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-10.

Controller/processor 240 of base station 110, controller/processor 280 of UE 120, and/or any other component(s) of FIG. 2 may perform one or more techniques associated with code block group (CBG)-based transmission, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a wireless communication device may include means for transmitting, to a receiving device, an identification of a subset of CBGs of a set of CBGs, wherein the set of CBGs comprises a transport block (TB), means for transmitting, to the receiving device, an initial data transmission comprising the subset of CBGs, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless communication device may include means for receiving, from a transmitting device, an identification of a subset of CBGs of a set of CBGs, wherein the set of CBGs comprises a TB, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
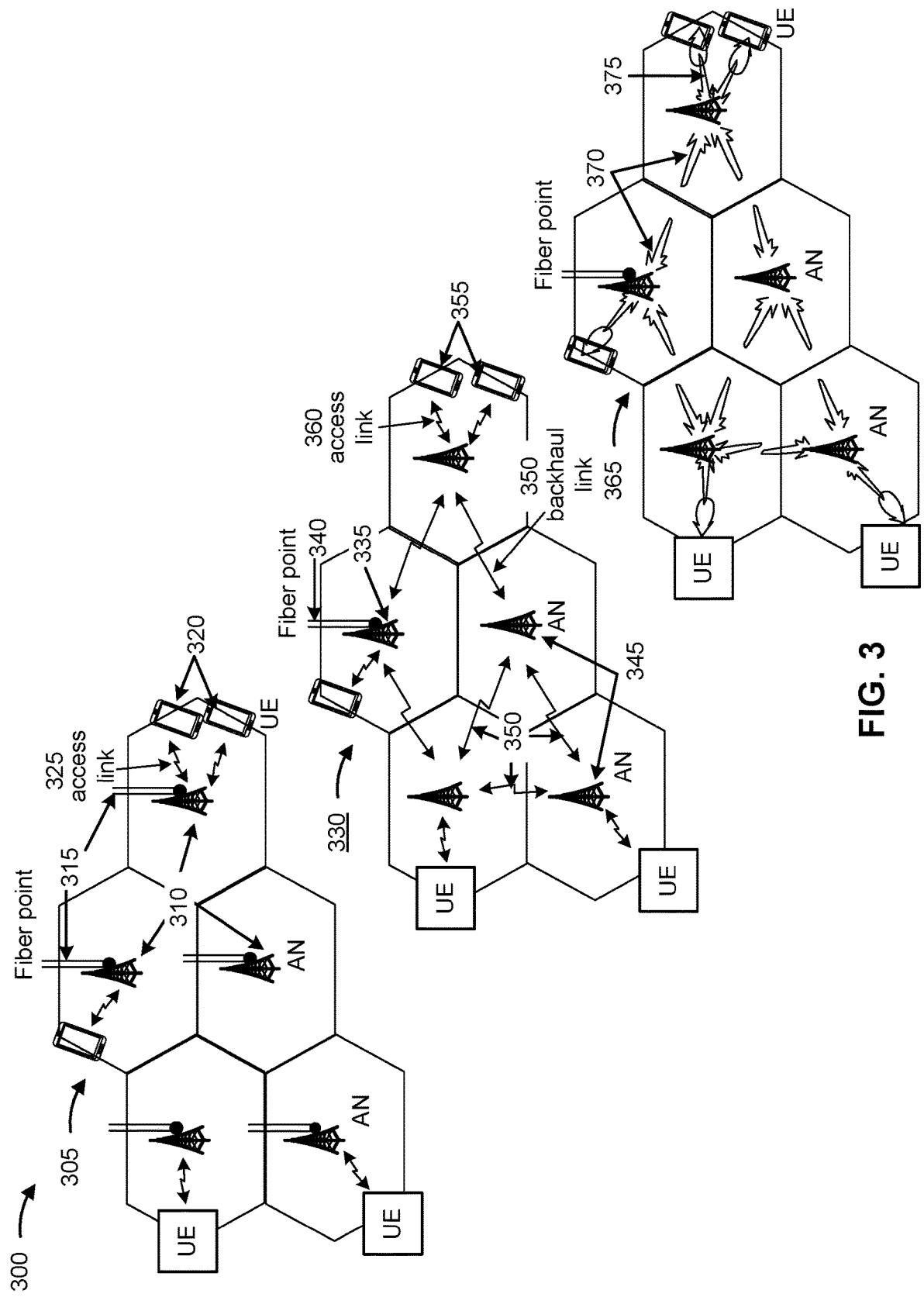
FIG. 3 is a diagram illustrating examples of radio access networks, in accordance with the disclosure.

FIG. 3 is a diagram illustrating examples 300 of radio access networks, in accordance with the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in 3 may be a base station 110 shown in FIG. 1. In some aspects, a UE 320 shown in 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in 3 may be a base station 110 shown in FIG. 1. In some aspects, a UE 355 shown in 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in 3 is shown as an example, and other examples are contemplated. For example, one or more base stations illustrated in 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
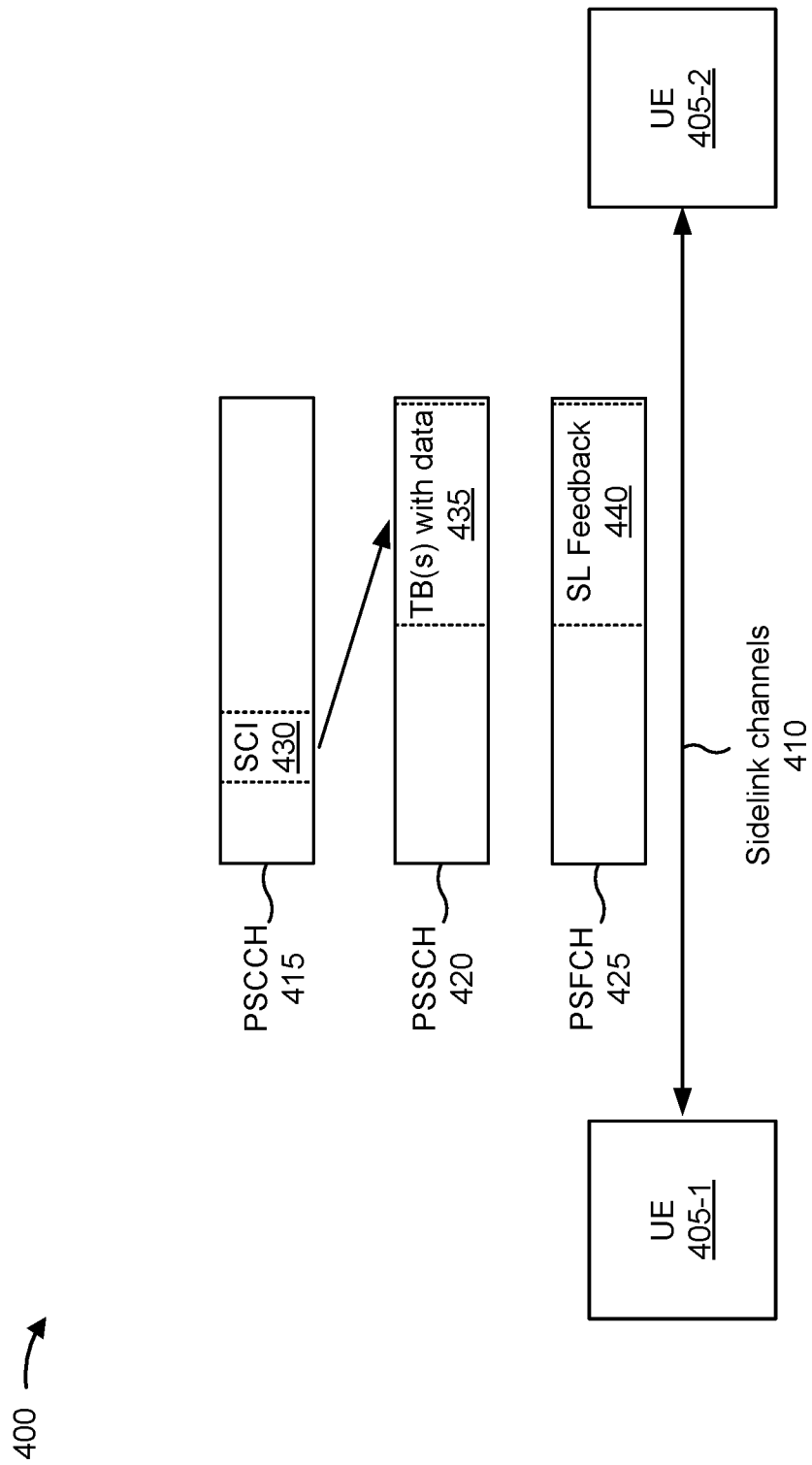
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, an MCS to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
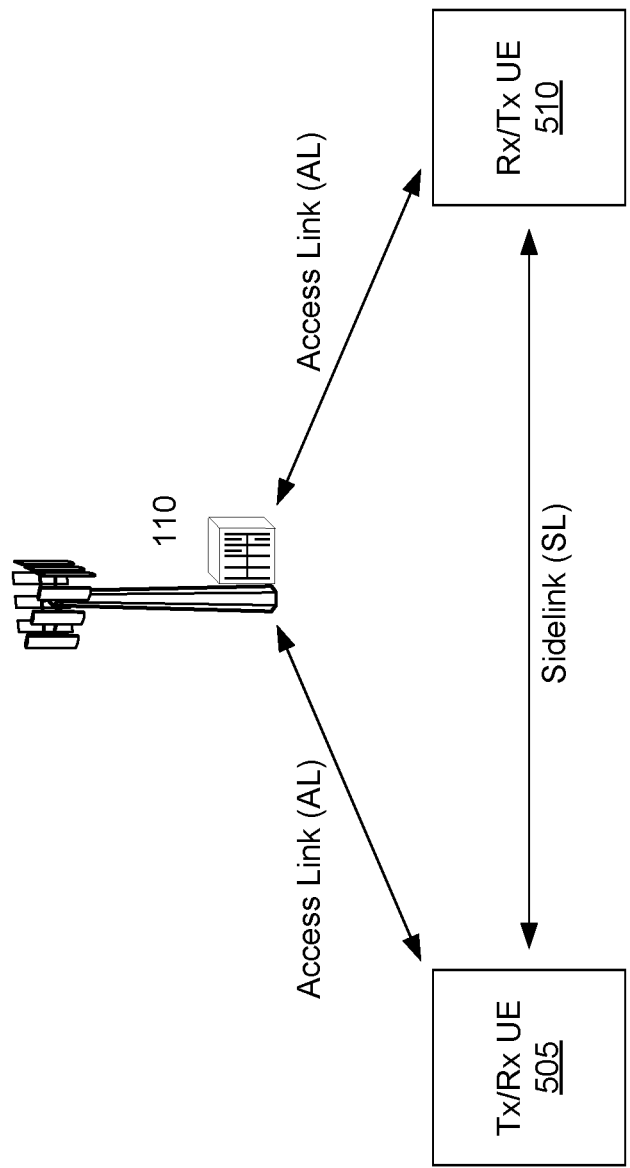
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx) UE 505 and a receiver (Rx) UE 510 may communicate with one another via a sidelink, as described above in connection with FIG. 4. As further shown, in some sidelink modes, a base station 110 may communicate with the Tx UE 505 via a first access link. Additionally, or alternatively, in some sidelink modes, the base station 110 may communicate with the Rx UE 510 via a second access link. The Tx UE 505 and/or the Rx UE 510 may correspond to one or more UEs described elsewhere herein, such as the UE 120 of FIG. 1. Thus, "sidelink" may refer to a direct link between UEs 120, and "access link" may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Some existing wireless communication standards support CBG-based transmission in which a TB is divided into a set of code blocks, which may be grouped into CBGs for transmission. In these standards, a transmitting device transmits the entire set of CBGs in an initial data transmission. If one or more of the code block groups are not decoded properly, or not received, a hybrid automatic repeat request acknowledgment (HARQ-ACK) feedback message comprising a negative acknowledgement (NACK) for each of the CBGs not decoded properly is sent to the transmitting device to indicate the failure, and the transmitting device retransmits each of the CBGs not decoded properly. Transmitting and re-transmitting one or more CBGs may cause depletion of unnecessary resources, power, and/or the like, and may increase data traffic and overhead in communications.

Various aspects of techniques and apparatuses described herein provide for CBG-based transmission, in which a transmitting device may transmit a subset of CBGs of a set of CBGs, where the set of CBGs comprises a TB, in an initial data transmission. In this way, transmission resources and operating power may be saved, communication traffic and overhead may be reduced, and/or the like. In some aspects, a transmitting device may be a source device in a point-to-point communication, a source device in a relayed communication, or a relay device in a relayed communication. In some aspects, the transmitting device may transmit, to a receiving device, an identification of the subset of CBGs to be transmitted to the receiving device. The identification may be transmitted via a HARQ-ACK feedback message, uplink control information (UCI), and/or the like. In this manner, the receiving device may be informed of the data it will receive.

Figure 6:
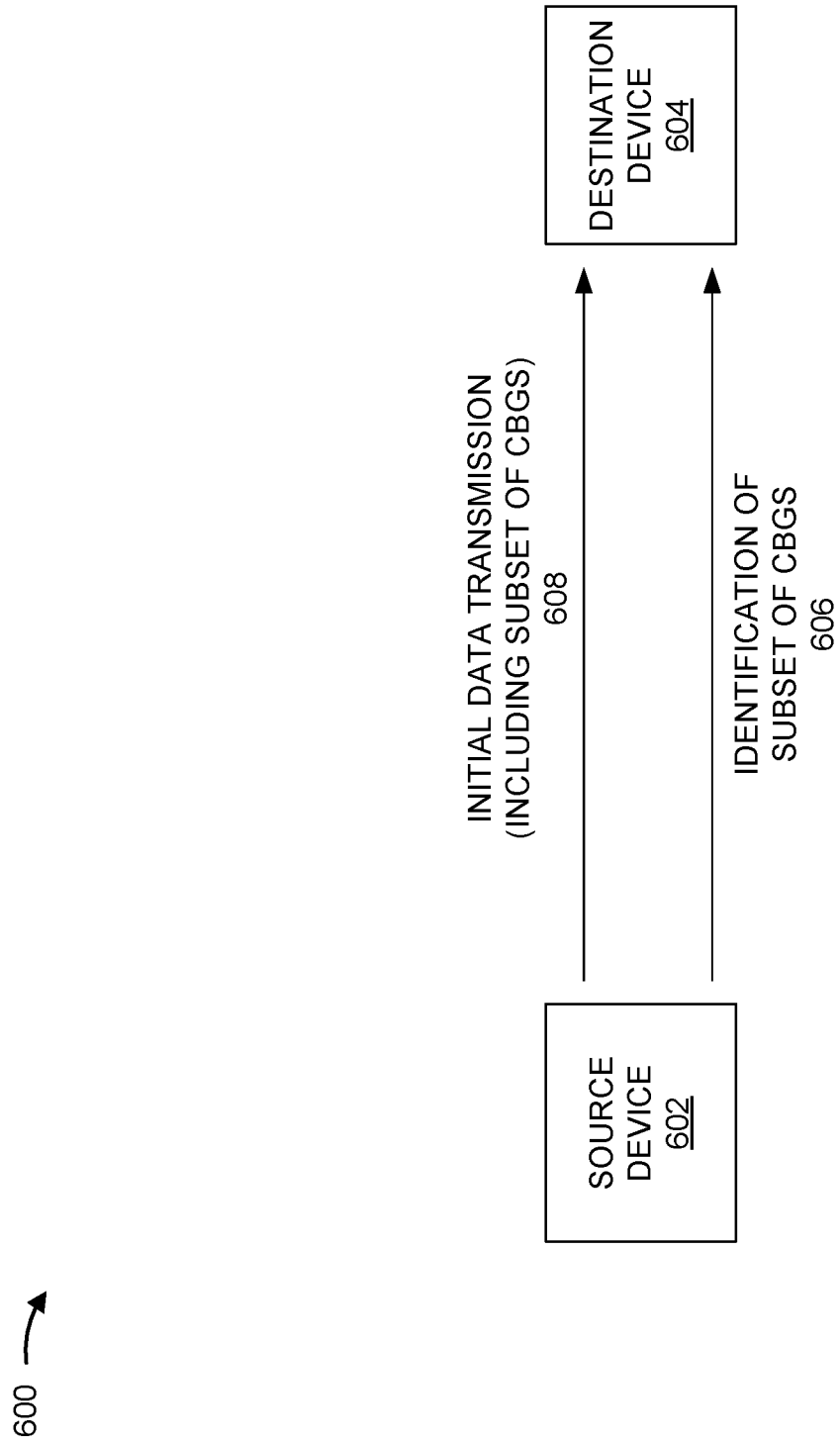
FIGS. 6-8 are diagrams illustrating examples of code block group-based transmission, in accordance with the present disclosure.

FIG. 6 is a diagram illustrating an example 600 of CBG-based transmission, in accordance with the present disclosure. As shown, a source device 602 and a destination device 604 may communicate with one another via a point-to-point communication. In some aspects, the point-to-point communication may include an access link communication, a sidelink communication, and/or the like. The source device 602 may be a wireless communication device such as a UE 120, and the destination device 604 may be a wireless communication device such as another UE 120, a base station 110, and/or the like.

As shown by reference number 606, the source device 602 may transmit, and the destination device 604 may receive, an identification of a subset of CBGs of a set of CBGs. The set of CBGs may include a TB. In some aspects, the source device 602 may prepare the set of CBGs for an intended transmission based at least in part on an initial resource allocation. The source device 602 may receive a subsequent resource allocation that includes fewer resources than the initial resource allocation. The source device 602 may transmit the subset of CBGs based at least in part on the subsequent resource allocation.

As shown by reference number 608, the source device 602 may transmit, and the destination device 604 may receive, an initial data transmission that includes the subset of CBGs. According to some aspects, the initial data transmission may include one or more padding bits. The set of CBGs may include a quantity of bits equal to a sum of a quantity of bits corresponding to the subset of CBGs and a quantity of the one or more padding bits.

In some aspects, a content indicated by the one or more padding bits may be configured to cause a failure of a code block cyclic redundancy check (CRC), a TB CRC, and/or the like. In some aspects, the source device 602 may transmit, and the destination device 604 may receive, a CBG Flush Indicator (CBGFI). The CBGFI may cause a log-likelihood ratio decoder buffer of the destination device 604, and associated with the one or more padding bits, to be erased.

Various aspects of the techniques discussed above facilitate CBG-based transmission, in which the transmitting device may transmit a subset of CBGs of a set of CBGs, where the set of CBGs comprises a TB. In this way, transmission resources and operating power may be saved, communication traffic and overhead may be reduced, and/or the like. In some aspects, the transmitting device may transmit, to the receiving device, an identification of the subset of CBGs to be transmitted to the receiving device. The identification may be transmitted via a HARQ-ACK feedback message, UCI, and/or the like. In this manner, the receiving device may be informed of the data it will receive.

As indicated above, FIG. 6 is provided as an example. Other examples may differ from what is described with respect to FIG. 6.

Figure 7:
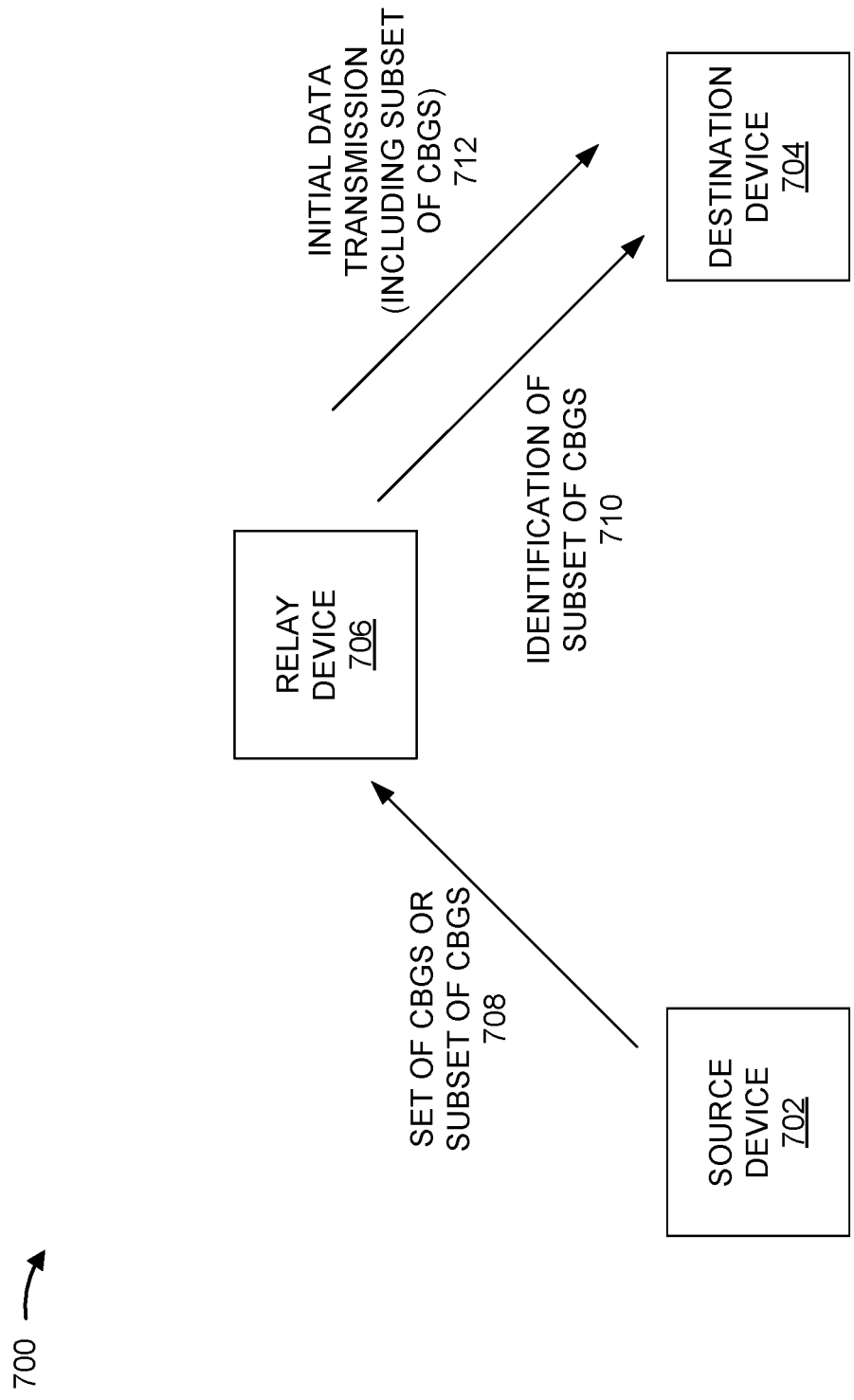

FIG. 7 is a diagram illustrating an example 700 of CBG-based transmission, in accordance with the present disclosure. As shown, a source device 702 and a destination device 704 may communicate with one another, via a relayed communication, through a relay device 706. In some aspects, the relayed communications depicted in FIG. 7 may include one or more aspects described above in connection with FIG. 6.

In some aspects, the relayed communication may include an uplink communication in which the source device 702 comprises a first UE 120, the destination device 704 comprises a base station 110, and the relay device 706 comprises a second UE 120. In some aspects, the relayed communication may include a sidelink support communication in which the source device 702 comprises a first UE 120, the destination device 704 comprises a second UE 120, and the relay device 706 comprises a base station 110. In some aspects, the relayed communication may include an IAB communication in which the source device 702 comprises a first IAB node, the destination device 704 comprises a second IAB node, and the relay device 706 comprises a third IAB node. In some aspects, the source device 702 and the destination device 704 may communicate directly with one another in addition to, or in lieu of, the relayed communication through the relay device 706.

As shown by reference number 708, the source device 702 may transmit, and the relay device 706 may receive, a set of CBGs or a subset of CBGs (of the set of CBGs). The set of CBGs may include a TB. As shown by reference number 710, the relay device 706 may transmit, and the destination device 704 may receive, an indication of the subset of CBGs. In some aspects, the relay device 706 may decode the subset of CBGs, and the identification of the subset of CBGs may include a HARQ-ACK status message that indicates that the relay device 706 decoded the subset of CBGs.

In some aspects, the identification of the subset of CBGs may be carried in a PUCCH transmission or a PUSCH transmission. In some aspects, the identification of the subset of CBGs may include CBG transmission information (CBGTI). In some aspects, the identification of the subset of CBGs may be carried in UCI. The UCI may be carried in a transmission that is different than an initial data transmission containing the subset of CBGs. In some aspects, the UCI may be carried in a PUSCH transmission that carries the subset of CBGs.

As shown by reference number 712, the relay device 706 may transmit, and the destination device 704 may receive, an initial data transmission that includes the subset of CBGs. In some aspects, the relay device 706 may transmit the subset of CBGs by performing bit repetition within one or more code blocks of the subset of CBGs, code block repetition within one or more CBGs of the subset of CBGs, CBG repetition within the subset of CBGs, and/or the like. In some aspects, the subset of CBGs may be transmitted with a spectral efficiency that is lower than a spectral efficiency associated with transmitting the set of CBGs (if the relay device 706 were to transmit the set of CBGs).

In some aspects, the relay device 706 may perform bit repetition by performing a rate-matching procedure. In some aspects, performing the rate-matching procedure may include performing the rate-matching procedure within each code block of the subset of CBGs to generate a plurality of rate-matched bits. The quantity of the plurality of rate-matched bits may be equal to a quantity of bits associated with the set of CBGs. In some aspects, performing CBG repetition may include retransmitting the subset of CBGs according to a repetition pattern. In some aspects, one or more code blocks may be repeated or dropped so that a resulting pattern of code blocks per CBG corresponds to a pattern of code blocks per CBG associated with the set of CBGs.

In some aspects, the initial data transmission may be transmitted with a spectral efficiency that is equal to a spectral efficiency associated with a transmission of the set of CBGs (if the relay device 706 were to transmit the set of CBGs). In some aspects, a resource allocation associated with the initial data transmission may include a quantity of resources that is fewer than a quantity of resources of a resource allocation associated with a transmission of the set of CBGs (if the relay device 706 were to transmit the set of CBGs).

In some aspects, the relay device 706 may determine a TB size (TBS) corresponding to the subset of CBGs using a TBS formula that is modified by a scaling factor. In some aspects, the scaling factor may include a ratio of a quantity of CBGs in the set of CBGs to a quantity of CBGs in the subset of CBGs. In some aspects, the scaling factor may be indicated by one or more parameters in downlink control information (DCI). In some aspects, the scaling factor may include a two-bit scaling factor, and the DCI may be scheduled by a physical downlink control channel scrambled with a paging radio network temporary identifier (RNTI), a range RNTI, and/or the like.

Various aspects of the techniques described above may facilitate CBG-based transmission, in which a transmitting device may transmit a subset of CBGs of a set of CBGs, where the set of CBGs comprises a TB. In this way, transmission resources and operating power may be saved, communication traffic and overhead may be reduced, and/or the like. In some aspects, a transmitting device may be a source device in a relayed communication, or a relay device in a relayed communication. In some aspects, the transmitting device may transmit, to a receiving device, an identification of the subset of CBGs to be transmitted to the receiving device. The identification may be transmitted via a HARQ-ACK feedback message, UCI, and/or the like. In this manner, the receiving device may be informed of the data it will receive.

As indicated above, FIG. 7 is provided as an example. Other examples may differ from what is described with respect to FIG. 7.

Figure 8:
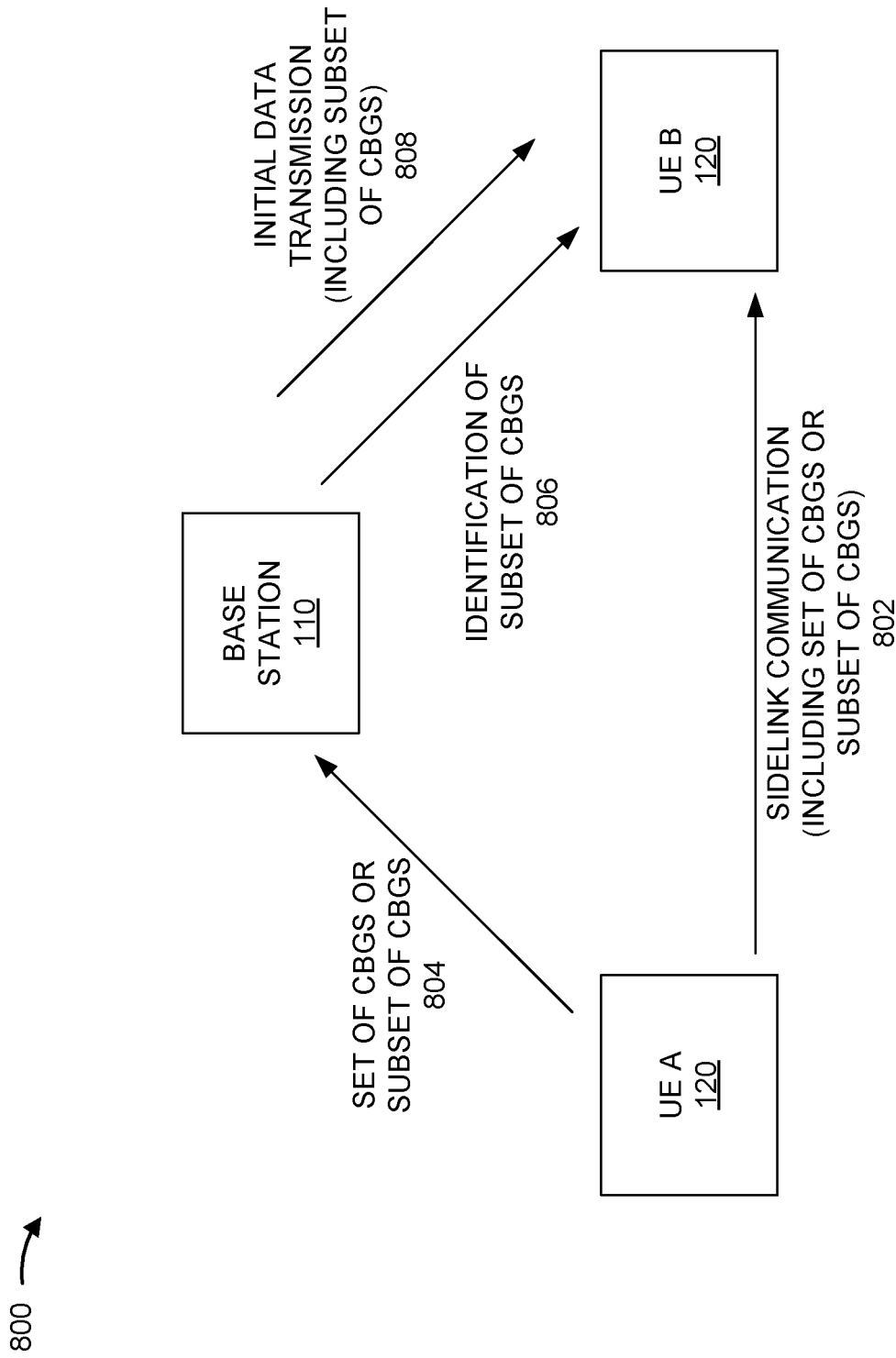

FIG. 8 is a diagram illustrating an example 800 of CBG-based transmission, in accordance with the present disclosure. As shown, a first UE 120 (UE A) and a second UE 120 (UE B) may communicate with one another via a sidelink communication. The UE A and UE B may communicate with a base station 110 via access link communications. In some aspects, the UE A may be a source device, the UE B may be a destination device, and the base station may be a relay device. The relay device may facilitate a sidelink support communication. In some aspects, the relayed communications depicted in FIG. 8 may include one or more aspects described above in connection with FIG. 6 and/or FIG. 7.

As shown by reference number 802, the UE A 120 may transmit, and the UE B 120 may receive, a sidelink communication that includes a set of CBGs or a subset thereof. As shown by reference number 804, the UE A 120 may transmit, and the base station 110 may receive, a subset of CBGs. In some aspects, the UE A 120 may transmit, and the base station 110 may receive, the set of CBGs.

As shown by reference number 806, the base station 110 may transmit, and the UE B 120 may receive, an identification of the subset of the CBGs. As shown by reference number 808, the base station 110 may transmit, and the UE B 120 may receive, the identified subset of the CBGs. In some aspects, the UE A 120 may transmit the set of CBGs to the UE B 120 via the sidelink communication and may transmit the set of CBGs to the UE B 120 via the relayed communication. In some aspects, the UE A 120 may transmit a first subset of the set of CBGs to the UE B 120 via the sidelink communication and a second subset of the set of CBGs to the UE B 120 via the relayed communication. In some aspects, the first subset and the second subset may be combined by the UE B 120 to form the set of the CBGs. In this way, the relayed communication facilitated by the base station 110 may provide diversity of communication to support the sidelink communication between the UE A 120 and the UE B 120, thereby providing for a more robust communication.

As indicated above, FIG. 8 is provided as an example. Other examples may differ from what is described with respect to FIG. 8.

Figure 9:
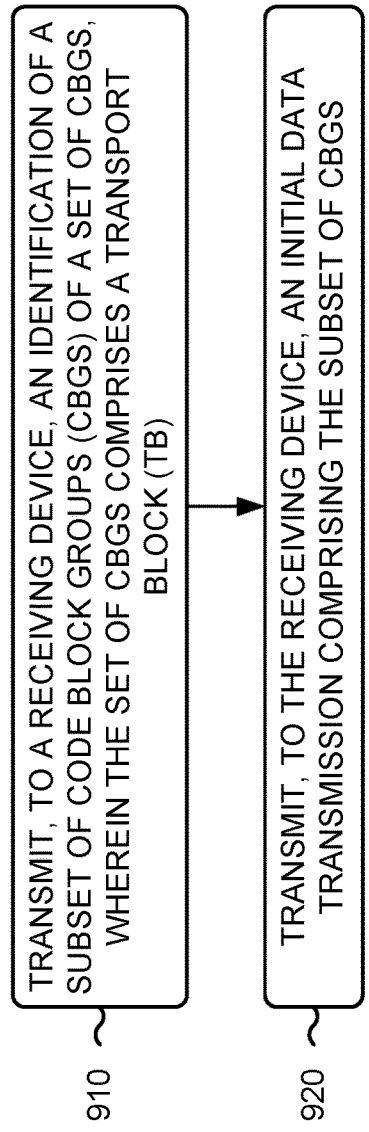
FIGS. 9 and 10 are diagrams illustrating example processes performed, for example, by a wireless communication device, in accordance with the present disclosure.

FIG. 9 is a diagram illustrating an example process 900 performed, for example, by a wireless communication device, in accordance with the present disclosure. Example process 900 is an example where the wireless communication device (e.g., base station 110, UE 120, and/or the like) performs operations associated with CBG-based transmission.

As shown in FIG. 9, in some aspects, process 900 may include transmitting, to a receiving device, an identification of a subset of CBGs of a set of CBGs, wherein the set of CBGs comprises a TB (block 910). For example, the wireless communication device (e.g., using transmit processor 220, transmit processor 264, controller/processor 240, controller/processor 280, memory 242, memory 282, and/or the like) may transmit, to a receiving device, an identification of a subset of CBGs of a set of CBGs, as described above. In some aspects, the set of CBGs comprises a TB.

As further shown in FIG. 9, in some aspects, process 900 may include transmitting, to the receiving device, an initial data transmission comprising the subset of CBGs (block 920). For example, the wireless communication device (e.g., using transmit processor 220, transmit processor 264, controller/processor 240, controller/processor 280, memory 242, memory 282, and/or the like) may transmit, to the receiving device, an initial data transmission comprising the subset of CBGs, as described above.

Process 900 may include additional aspects, such as any single aspect or any combination of aspects described below and/or in connection with one or more other processes described elsewhere herein.

In a first aspect, process 900 includes preparing the set of CBGs for an intended transmission based at least in part on an initial resource allocation; and receiving a subsequent resource allocation, wherein the subsequent resource allocation comprises fewer resources than the initial resource allocation, and wherein the subset of CBGs is transmitted based at least in part on the subsequent resource allocation.

In a second aspect, alone or in combination with the first aspect, the receiving device comprises a destination device in a point-to-point communication between a source device and the destination device, and the wireless communication device comprises the source device.

In a third aspect, alone or in combination with the second aspect, the point-to-point communication comprises an access link communication or a sidelink communication.

In a fourth aspect, alone or in combination with the first aspect, the wireless communication device comprises a relay device in a relayed communication between a source device and a destination device, and the receiving device comprises the destination device.

In a fifth aspect, alone or in combination with the fourth aspect, process 900 includes receiving, from the source device, the subset of CBGs.

In a sixth aspect, alone or in combination with the fifth aspect, process 900 includes decoding the subset of CBGs, wherein the identification of the subset of CBGs comprises a HARQ-ACK status message that indicates that the wireless communication device decoded the subset of CBGs.

In a seventh aspect, alone or in combination with the fourth aspect, process 900 includes receiving, from the source device, the set of CBGs.

In an eighth aspect, alone or in combination with one or more of the fourth through seventh aspects, the relayed communication comprises: an uplink communication, wherein the source device comprises a first UE, the relay device comprises a second UE, and the destination device comprises a base station; a sidelink support communication, wherein the source device comprises a first UE, the destination device comprises a second UE, and the relay device comprises a base station; an IAB communication, wherein the source device comprises a first IAB node, the destination device comprises a second IAB node, and the relay device comprises a third IAB node; or a combination thereof.

In a ninth aspect, alone or in combination with the eighth aspect, the relayed communication comprises the uplink communication, and the identification of the subset of CBGs is carried in a PUCCH transmission or a PUSCH transmission.

In a tenth aspect, alone or in combination with one or more of the eighth or ninth aspects, the relayed communication comprises the uplink communication, and the identification of the subset of CBGs comprises CBGTI.

In an eleventh aspect, alone or in combination with the tenth aspect, the relayed communication comprises the uplink communication, and the identification of the subset of CBGs is carried in UCI.

In a twelfth aspect, alone or in combination with the eleventh aspect, the UCI is carried in a transmission that is different than the initial data transmission.

In a thirteenth aspect, alone or in combination with one or more of the eleventh or twelfth aspects, the initial data transmission comprises a PUSCH transmission, and the UCI is carried in the PUSCH transmission.

In a fourteenth aspect, alone or in combination with the eighth aspect, the relayed communication comprises the sidelink support communication, and the sidelink support communication supports a sidelink connection between the first UE and the second UE.

In a fifteenth aspect, alone or in combination with one or more of the first through fourteenth aspects, the initial data transmission comprises one or more padding bits, and the set of CBGs comprises a quantity of bits equal to a sum of a quantity of bits corresponding to the subset of CBGs and a quantity of the one or more padding bits.

In a sixteenth aspect, alone or in combination with the fifteenth aspect, a content indicated by the one or more padding bits is configured to cause a failure of at least one of: a code block CRC, a TB CRC, or a combination thereof.

In a seventeenth aspect, alone or in combination with the fifteenth aspect, process 900 includes transmitting, to the receiving device, a CBGFI, wherein the CBGFI is to cause a log-likelihood ratio decoder buffer of the receiving device, and associated with the one or more padding bits, to be erased.

In an eighteenth aspect, alone or in combination with one or more of the first through seventeenth aspects, the wireless communication device comprises a relay device in a relayed communication between a source device and a destination device, the receiving device comprises the destination device, and transmitting the subset of CBGs comprises performing at least one of: bit repetition within one or more code blocks of the subset of CBGs, code block repetition within one or more CBGs of the subset of CBGs, CBG repetition within the subset of CBGs, or a combination thereof.

In a nineteenth aspect, alone or in combination with the eighteenth aspect, the subset of CBGs is transmitted with a spectral efficiency that is lower than a spectral efficiency associated with transmitting the set of CBGs.

In a twentieth aspect, alone or in combination with one or more of the eighteenth or nineteenth aspects, performing bit repetition comprises performing a rate-matching procedure.

In a twenty-first aspect, alone or in combination with the twentieth aspect, performing the rate-matching procedure comprises performing the rate-matching procedure within each code block of the subset of CBGs to generate a plurality of rate-matched bits.

In a twenty-second aspect, alone or in combination with the twenty-first aspect, a quantity of the plurality of rate-matched bits is equal to a quantity of bits associated with the set of CBGs.

In a twenty-third aspect, alone or in combination with one or more of the eighteenth through twenty-second aspects, performing CBG repetition comprises: retransmitting the subset of CBGs according to a repetition pattern, wherein one or more code blocks are repeated or dropped so that a resulting pattern of code blocks per CBG corresponds to a pattern of code blocks per CBG associated with the set of CBGs.

In a twenty-fourth aspect, the wireless communication device comprises a relay device in a relayed communication between a source device and a destination device, the receiving device comprises the destination device, and the initial data transmission comprises a spectral efficiency that is equal to a spectral efficiency associated with a transmission of the set of CBGs.

In a twenty-fifth aspect, alone or in combination with the twenty-fourth aspect, a resource allocation associated with the initial data transmission comprises a quantity of resources that is fewer than a quantity of resources of a resource allocation associated with a transmission of the set of CBGs.

In a twenty-sixth aspect, alone or in combination with the twenty-fifth aspect, process 900 includes determining a TBS corresponding to the subset of CBGs using a TBS formula that is modified by a scaling factor.

In a twenty-seventh aspect, alone or in combination with the twenty-sixth aspect, the scaling factor comprises a ratio of a quantity of CBGs in the set of CBGs to a quantity of CBGs in the subset of CBGs.

In a twenty-eighth aspect, alone or in combination with one or more of the twenty-sixth or twenty-seventh aspects, the scaling factor is indicated by one or more parameters in DCI.

In a twenty-ninth aspect, alone or in combination with the twenty-eighth aspect, the scaling factor comprises a two-bit scaling factor, and the DCI is scheduled by a PDCCH scrambled with at least one of: a paging RNTI, a range RNTI, or a combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
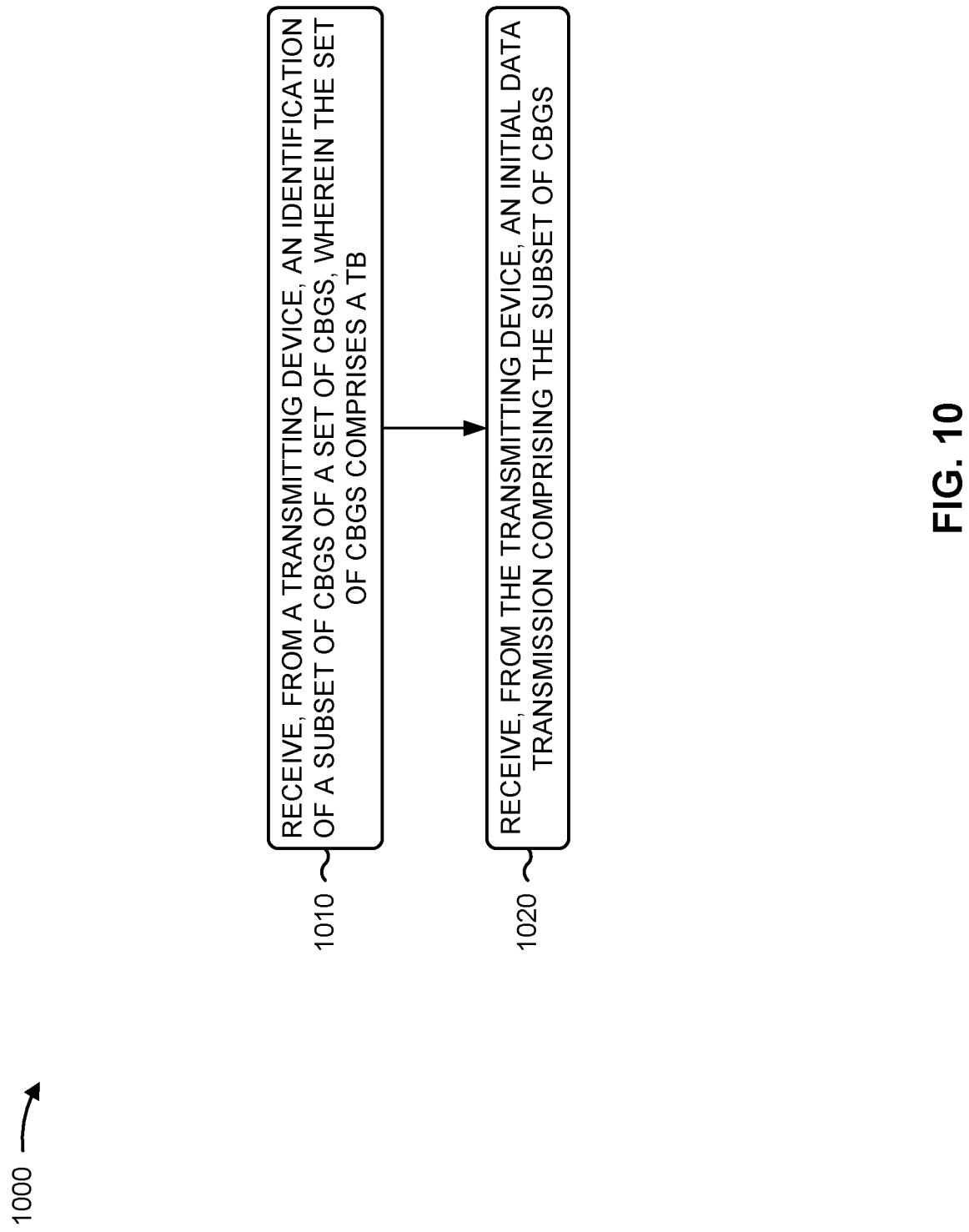

FIG. 10 is a diagram illustrating an example process 1000 performed, for example, by a wireless communication device, in accordance with the present disclosure. Example process 1000 is an example where the wireless communication device (e.g., base station 110, UE 120, and/or the like) performs operations associated with CBG-based transmission.

As shown in FIG. 10, in some aspects, process 1000 may include receiving, from a transmitting device, an identification of a subset of CBGs of a set of CBGs, wherein the set of CBGs comprises a TB (block 1010). For example, the wireless communication device (e.g., using receive processor 238, receive processor 258, controller/processor 240, controller/processor 280, memory 242, memory 282, and/or the like) may receive, from a transmitting device, an identification of a subset of CBGs of a set of CBGs, as described above. In some aspects, the set of CBGs comprises a TB.

As further shown in FIG. 10, in some aspects, process 1000 may include receiving, from the transmitting device, an initial data transmission comprising the subset of CBGs (block 1020). For example, the wireless communication device (e.g., using receive processor 238, receive processor 258, controller/processor 240, controller/processor 280, memory 242, memory 282, and/or the like) may receive, from the transmitting device, an initial data transmission comprising the subset of CBGs, as described above.

Process 1000 may include additional aspects, such as any single aspect or any combination of aspects described below and/or in connection with one or more other processes described elsewhere herein.

In a first aspect, the wireless communication device comprises a destination device in a point-to-point communication between a source device and the destination device, and the transmitting device comprises the source device.

In a second aspect, alone or in combination with the first aspect, the point-to-point communication comprises an access link communication or a sidelink communication.

In a third aspect, the transmitting device comprises a relay device in a relayed communication between a source device and a destination device, and the wireless communication device comprises the destination device.

In a fourth aspect, alone or in combination with the third aspect, the identification of the subset of CBGs comprises a HARQ-ACK status message that indicates that the transmitting device decoded the subset of CBGs.

In a fifth aspect, alone or in combination with one or more of the third or fourth aspects, the relayed communication comprises: an uplink communication, wherein the source device comprises a first UE, the relay device comprises a second UE, and the destination device comprises a base station; a sidelink support communication, wherein the source device comprises a first UE, the destination device comprises a second UE, and the relay device comprises a base station; an IAB communication, wherein the source device comprises a first IAB node, the destination device comprises a second IAB node, and the relay device comprises a third IAB node; or a combination thereof.

In a sixth aspect, alone or in combination with the fifth aspect, the relayed communication comprises the uplink communication, and the identification of the subset of CBGs is carried in a PUCCH transmission or a PUSCH transmission.

In a seventh aspect, alone or in combination with one or more of the fifth or sixth aspects, the relayed communication comprises the uplink communication, and the identification of the subset of CBGs comprises CBG transmission information.

In an eighth aspect, alone or in combination with the fifth aspect, the relayed communication comprises the uplink communication, and the identification of the subset of CBGs is carried in UCI.

In a ninth aspect, alone or in combination with the eighth aspect, the UCI is carried in a transmission that is different than the initial data transmission.

In a tenth aspect, alone or in combination with one or more of the eighth or ninth aspects, the initial data transmission comprises a PUSCH transmission, and the UCI is carried in the PUSCH transmission.

In an eleventh aspect, alone or in combination with the fifth aspect, the relayed communication comprises the sidelink support communication, and the sidelink support communication supports a sidelink connection between the first UE and the second UE.

In a twelfth aspect, alone or in combination with one or more of the first through eleventh aspects, receiving the initial data transmission comprises: receiving, from the transmitting device, one or more padding bits, wherein the set of CBGs comprises a quantity of bits equal to a sum of a quantity of bits corresponding to the subset of CBGs and a quantity of the one or more padding bits.

In a thirteenth aspect, alone or in combination with the twelfth aspect, a content indicated by the one or more padding bits is configured to cause a failure of at least one of: a code block CRC, a TB CRC, or a combination thereof.

In a fourteenth aspect, alone or in combination with one or more of the twelfth or thirteenth aspects, process 1000 includes receiving, from the transmitting device, a CBGFI; and erasing, based at least in part on the CBGFI, a log-likelihood ratio decoder buffer associated with the one or more padding bits.

In a fifteenth aspect, the wireless communication device comprises a destination device in a relayed communication between a source device and the destination device, the transmitting device comprises the relay device, and the initial data transmission is based at least in part on at least one of: a bit repetition procedure within one or more code blocks of the subset of CBGs, a code block repetition procedure within one or more CBGs of the subset of CBGs, a CBG repetition procedure within the subset of CBGs, or a combination thereof.

In a sixteenth aspect, alone or in combination with the fifteenth aspect, the initial data transmission comprises a spectral efficiency that is lower than a spectral efficiency associated with a transmission of the set of CBGs.

In a seventeenth aspect, alone or in combination with one or more of the fifteenth or sixteenth aspects, the bit repetition procedure comprises a rate-matching procedure.

In an eighteenth aspect, alone or in combination with the seventeenth aspect, the initial data transmission comprises a plurality of rate-matched bits generated based at least in part on the rate-matching procedure, wherein the rate-matching procedure corresponds to each code block of the subset of CBGs.

In a nineteenth aspect, alone or in combination with the eighteenth aspect, a quantity of the plurality of rate-matched bits is equal to a quantity of bits associated with the set of CBGs.

In a twentieth aspect, alone or in combination with one or more of the fifteenth through nineteenth aspects, the CBG repetition procedure comprises a retransmission of the subset of CBGs according to a repetition pattern, wherein one or more code blocks are repeated in the retransmission or dropped from the retransmission so that a resulting pattern of code blocks per CBG corresponds to a pattern of code blocks per CBG associated with the set of CBGs.

In a twenty-first aspect, the wireless communication device comprises a destination device in a relayed communication between a source device and the destination device, the transmitting device comprises the relay device, and the initial data transmission comprises a spectral efficiency that is equal to a spectral efficiency associated with a transmission of the set of CBGs.

In a twenty-second aspect, alone or in combination with the twenty-first aspect, a resource allocation associated with the initial data transmission comprises a quantity of resources that is fewer than a quantity of resources of a resource allocation associated with a transmission of the set of CBGs.

In a twenty-third aspect, alone or in combination with the through twenty-second aspect, a TBS corresponding to the subset of CBGs is based at least in part on a TBS formula that is modified by a scaling factor.

In a twenty-fourth aspect, alone or in combination with the twenty-third aspect, the scaling factor comprises a ratio of a quantity of CBGs in the set of CBGs to a quantity of CBGs in the subset of CBGs.

In a twenty-fifth aspect, alone or in combination with the twenty-fourth aspect, the scaling factor is indicated by one or more parameters in DCI.

In a twenty-sixth aspect, alone or in combination with one or more of the twenty-fourth or twenty-fifth aspects, the scaling factor comprises a two-bit scaling factor, and the DCI is scheduled by a PDSCH scrambled with at least one of: a paging RNTI, a range RNTI, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some aspects of the present disclosure:

Aspect 1: A method of wireless communication performed by a wireless communication device, comprising: transmitting, to a receiving device, an identification of a subset of code block groups (CBGs) of a set of CBGs, wherein the set of CBGs comprises a transport block (TB); and transmitting, to the receiving device, an initial data transmission comprising the subset of CBGs.

Aspect 2: The method of aspect 1, further comprising: preparing the set of CBGs for an intended transmission based at least in part on an initial resource allocation; and receiving a subsequent resource allocation, wherein the subsequent resource allocation comprises fewer resources than the initial resource allocation, wherein the subset of CBGs is transmitted based at least in part on the subsequent resource allocation.

Aspect 3: The method of either of aspects 1 or 2, wherein the receiving device comprises a destination device in a point-to-point communication between a source device and the destination device, wherein the wireless communication device comprises the source device.

Aspect 4: The method of aspect 3, wherein the point-to-point communication comprises an access link communication or a sidelink communication.

Aspect 5: The method of aspect 1, wherein the wireless communication device comprises a relay device in a relayed communication between a source device and a destination device, wherein the receiving device comprises the destination device.

Aspect 6: The method of aspect 5, further comprising receiving, from the source device, the subset of CBGs.

Aspect 7: The method of aspect 6, further comprising decoding the subset of CBGs, wherein the identification of the subset of CBGs comprises a hybrid automatic repeat request acknowledgement status message that indicates that the wireless communication device decoded the subset of CBGs.

Aspect 8: The method of aspect 5, further comprising receiving, from the source device, the set of CBGs.

Aspect 9: The method of any of aspects 5-8, wherein the relayed communication comprises: an uplink communication, wherein the source device comprises a first user equipment (UE), the relay device comprises a second UE, and the destination device comprises a base station; a sidelink support communication, wherein the source device comprises a first UE, the destination device comprises a second UE, and the relay device comprises a base station; an integrated access and backhaul (IAB) communication, wherein the source device comprises a first IAB node, the destination device comprises a second IAB node, and the relay device comprises a third IAB node; or a combination thereof.

Aspect 10: The method of aspect 9, wherein the relayed communication comprises the uplink communication, and wherein the identification of the subset of CBGs is carried in a physical uplink control channel transmission or a physical uplink shared channel (PUSCH) transmission.

Aspect 11: The method of either of aspects 9 or 10, wherein the relayed communication comprises the uplink communication, and wherein the identification of the subset of CBGs comprises CBG transmission information.

Aspect 12: The method of aspect 9, wherein the relayed communication comprises the uplink communication, and wherein the identification of the subset of CBGs is carried in uplink control information (UCI).

Aspect 13: The method of aspect 12, wherein the UCI is carried in a transmission that is different than the initial data transmission.

Aspect 14: The method of either of aspects 12 or 13, wherein the initial data transmission comprises a physical uplink shared channel (PUSCH) transmission, and wherein the UCI is carried in the PUSCH transmission.

Aspect 15: The method of aspect 9, wherein the relayed communication comprises the sidelink support communication, and wherein the sidelink support communication supports a sidelink connection between the first UE and the second UE.

Aspect 16: The method of any of aspects 1-15, wherein the initial data transmission comprises one or more padding bits, wherein the set of CBGs comprises a quantity of bits equal to a sum of a quantity of bits corresponding to the subset of CBGs and a quantity of the one or more padding bits.

Aspect 17: The method of aspect 16, wherein a content indicated by the one or more padding bits is configured to cause a failure of at least one of: a code block cyclic redundancy check (CRC), a TB CRC, or a combination thereof.

Aspect 18: The method of aspect 16, further comprising: transmitting, to the receiving device, a CBG Flush Indicator (CBGFI), wherein the CBGFI is to cause a log-likelihood ratio decoder buffer of the receiving device and associated with the one or more padding bits to be erased.

Aspect 19: The method of any of aspects 1-18, wherein the wireless communication device comprises a relay device in a relayed communication between a source device and a destination device, wherein the receiving device comprises the destination device, wherein transmitting the subset of CBGs comprises performing at least one of: bit repetition within one or more code blocks of the subset of CBGs, code block repetition within one or more CBGs of the subset of CBGs, CBG repetition within the subset of CBGs, or a combination thereof.

Aspect 20: The method of aspect 19, wherein the subset of CBGs is transmitted with a spectral efficiency that is lower than a spectral efficiency associated with transmitting the set of CBGs.

Aspect 21: The method of either of aspects 19 or 20, wherein performing bit repetition comprises performing a rate-matching procedure.

Aspect 22: The method of aspect 21, wherein performing the rate-matching procedure comprises performing the rate-matching procedure within each code block of the subset of CBGs to generate a plurality of rate-matched bits.

Aspect 23: The method of aspect 22, wherein a quantity of the plurality of rate-matched bits is equal to a quantity of bits associated with the set of CBGs.

Aspect 24: The method of any of aspects 19-23, wherein performing CBG repetition comprises: retransmitting the subset of CBGs according to a repetition pattern, wherein one or more code blocks are repeated or dropped so that a resulting pattern of code blocks per CBG corresponds to a pattern of code blocks per CBG associated with the set of CBGs.

Aspect 25: The method of aspect 1, wherein the wireless communication device comprises a relay device in a relayed communication between a source device and a destination device, wherein the receiving device comprises the destination device, wherein the initial data transmission comprises a spectral efficiency that is equal to a spectral efficiency associated with a transmission of the set of CBGs.

Aspect 26: The method of aspect 25, wherein a resource allocation associated with the initial data transmission comprises a quantity of resources that is fewer than a quantity of resources of a resource allocation associated with a transmission of the set of CBGs.

Aspect 27: The method of aspect 26, further comprising: determining a TB size (TBS) corresponding to the subset of CBGs using a TBS formula that is modified by a scaling factor.

Aspect 28: The method of aspect 27, wherein the scaling factor comprises a ratio of a quantity of CBGs in the set of CBGs to a quantity of CBGs in the subset of CBGs.

Aspect 29: The method of either of aspects 27 or 28, wherein the scaling factor is indicated by one or more parameters in downlink control information (DCI).

Aspect 30: The method of aspect 29, wherein the scaling factor comprises a two-bit scaling factor, and wherein the DCI is scheduled by a physical downlink control channel scrambled with at least one of: a paging radio network temporary identifier (RNTI), a range RNTI, or a combination thereof.

Aspect 31: A method of wireless communication performed by a wireless communication device, comprising: receiving, from a transmitting device, an identification of a subset of code block groups (CBGs) of a set of CBGs, wherein the set of CBGs comprises a transport block (TB); and receiving, from the transmitting device, an initial data transmission comprising the subset of CBGs.

Aspect 32: The method of aspect 31, wherein the wireless communication device comprises a destination device in a point-to-point communication between a source device and the destination device, wherein the transmitting device comprises the source device.

Aspect 33: The method of aspect 32, wherein the point-to-point communication comprises an access link communication or a sidelink communication.

Aspect 34: The method of aspect 31, wherein the transmitting device comprises a relay device in a relayed communication between a source device and a destination device, wherein the wireless communication device comprises the destination device.

Aspect 35: The method of aspect 34, wherein the identification of the subset of CBGs comprises a hybrid automatic repeat request acknowledgement status message that indicates that the transmitting device decoded the subset of CBGs.

Aspect 36: The method of either of aspects 34 or 35, wherein the relayed communication comprises: an uplink communication, wherein the source device comprises a first user equipment (UE), the relay device comprises a second UE, and the destination device comprises a base station; a sidelink support communication, wherein the source device comprises a first UE, the destination device comprises a second UE, and the relay device comprises a base station; an integrated access and backhaul (IAB) communication, wherein the source device comprises a first TAB node, the destination device comprises a second TAB node, and the relay device comprises a third TAB node; or a combination thereof.

Aspect 37: The method of aspect 36, wherein the relayed communication comprises the uplink communication, and wherein the identification of the subset of CBGs is carried in a physical uplink control channel transmission or a physical uplink shared channel (PUSCH) transmission.

Aspect 38: The method of either of aspects 36 or 37, wherein the relayed communication comprises the uplink communication, and wherein the identification of the subset of CBGs comprises CBG transmission information.

Aspect 39: The method of aspect 36, wherein the relayed communication comprises the uplink communication, and wherein the identification of the subset of CBGs is carried in uplink control information (UCI).

Aspect 40: The method of aspect 39, wherein the UCI is carried in a transmission that is different than the initial data transmission.

Aspect 41: The method of either of aspects 39 or 40, wherein the initial data transmission comprises a physical uplink shared channel (PUSCH) transmission, and wherein the UCI is carried in the PUSCH transmission.

Aspect 42: The method of aspect 36, wherein the relayed communication comprises the sidelink support communication, and wherein the sidelink support communication supports a sidelink connection between the first UE and the second UE.

Aspect 43: The method of any of aspects 31-42, wherein receiving the initial data transmission comprises: receiving, from the transmitting device, one or more padding bits, wherein the set of CBGs comprises a quantity of bits equal to a sum of a quantity of bits corresponding to the subset of CBGs and a quantity of the one or more padding bits.

Aspect 44: The method of aspect 43, wherein a content indicated by the one or more padding bits is configured to cause a failure of at least one of: a code block cyclic redundancy check (CRC), a TB CRC, or a combination thereof.

Aspect 45: The method of either of aspects 43 or 44, further comprising: receiving, from the transmitting device, a CBG Flush Indicator (CBGFI); and erasing, based at least in part on the CBGFI, a log-likelihood ratio decoder buffer associated with the one or more padding bits.

Aspect 46: The method of aspect 31, wherein the wireless communication device comprises a destination device in a relayed communication between a source device and the destination device, wherein the transmitting device comprises the relay device, wherein the initial data transmission is based at least in part on at least one of: a bit repetition procedure within one or more code blocks of the subset of CBGs, a code block repetition procedure within one or more CBGs of the subset of CBGs, a CBG repetition procedure within the subset of CBGs, or a combination thereof.

Aspect 47: The method of aspect 46, wherein the initial data transmission comprises a spectral efficiency that is lower than a spectral efficiency associated with a transmission of the set of CBGs.

Aspect 48: The method of either of aspects 46 or 47, wherein the bit repetition procedure comprises a rate-matching procedure.

Aspect 49: The method of aspect 48, wherein the initial data transmission comprises a plurality of rate-matched bits generated based at least in part on the rate-matching procedure, wherein the rate-matching procedure corresponds to each code block of the subset of CBGs.

Aspect 50: The method of aspect 49, wherein a quantity of the plurality of rate-matched bits is equal to a quantity of bits associated with the set of CBGs.

Aspect 51: The method of any of aspects 46-50, wherein the CBG repetition procedure comprises a retransmission of the subset of CBGs according to a repetition pattern, wherein one or more code blocks are repeated in the retransmission or dropped from the retransmission so that a resulting pattern of code blocks per CBG corresponds to a pattern of code blocks per CBG associated with the set of CBGs.

Aspect 52: The method of aspect 31, wherein the wireless communication device comprises a destination device in a relayed communication between a source device and the destination device, wherein the transmitting device comprises the relay device, wherein the initial data transmission comprises a spectral efficiency that is equal to a spectral efficiency associated with a transmission of the set of CBGs.

Aspect 53: The method of aspect 52, wherein a resource allocation associated with the initial data transmission comprises a quantity of resources that is fewer than a quantity of resources of a resource allocation associated with a transmission of the set of CBGs.

Aspect 54: The method of aspect 53, wherein a TB size (TBS) corresponding to the subset of CBGs is based at least in part on a TBS formula that is modified by a scaling factor.

Aspect 55: The method of aspect 54, wherein the scaling factor comprises a ratio of a quantity of CBGs in the set of CBGs to a quantity of CBGs in the subset of CBGs.

Aspect 56: The method of aspect 55, wherein the scaling factor is indicated by one or more parameters in downlink control information (DCI).

Aspect 57: The method of aspect 55, wherein the scaling factor comprises a two-bit scaling factor, and wherein the DCI is scheduled by a physical downlink control channel scrambled with at least one of: a paging radio network temporary identifier (RNTI), a range RNTI, or a combination thereof.

Aspect 58: An apparatus for wireless communication at a device, comprising a processor; memory coupled with the processor; and instructions stored in the memory and executable by the processor to cause the apparatus to perform the method of one or more aspects of aspects 1-30.

Aspect 59: A device for wireless communication, comprising a memory and one or more processors coupled to the memory, the memory and the one or more processors configured to perform the method of one or more aspects of aspects 1-30.

Aspect 60: An apparatus for wireless communication, comprising at least one means for performing the method of one or more aspects of aspects 1-30.

Aspect 61: A non-transitory computer-readable medium storing code for wireless communication, the code comprising instructions executable by a processor to perform the method of one or more aspects of aspects 1-30.

Aspect 62: A non-transitory computer-readable medium storing a set of instructions for wireless communication, the set of instructions comprising one or more instructions that, when executed by one or more processors of a device, cause the device to perform the method of one or more aspects of aspects 1-30.

Aspect 63: An apparatus for wireless communication at a device, comprising a processor; memory coupled with the processor; and instructions stored in the memory and executable by the processor to cause the apparatus to perform the method of one or more aspects of aspects 31-57.

Aspect 64: A device for wireless communication, comprising a memory and one or more processors coupled to the memory, the memory and the one or more processors configured to perform the method of one or more aspects of aspects 31-57.

Aspect 65: An apparatus for wireless communication, comprising at least one means for performing the method of one or more aspects of aspects 31-57.

Aspect 66: A non-transitory computer-readable medium storing code for wireless communication, the code comprising instructions executable by a processor to perform the method of one or more aspects of aspects 31-57.

Aspect 67: A non-transitory computer-readable medium storing a set of instructions for wireless communication, the set of instructions comprising one or more instructions that, when executed by one or more processors of a device, cause the device to perform the method of one or more aspects of aspects 31-57.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
   a memory; and
   one or more processors coupled to the memory, the one or more processors configured to:
      transmit, to a receiving device, an identification of a subset of code block groups (CBGs) of a set of CBGs, wherein the set of CBGs comprises a transport block (TB), and wherein the identification of the subset of CBGs comprises a hybrid automatic repeat request acknowledgement (HARQ-ACK) status message associated with the subset of CBGs; and
      transmit, to the receiving device, an initial data transmission comprising the subset of CBGs.

2. The wireless communication device of claim 1, wherein the one or more processors are further configured to:
   prepare the set of CBGs for an intended transmission based at least in part on an initial resource allocation; and
   receive a subsequent resource allocation, wherein the subsequent resource allocation comprises fewer resources than the initial resource allocation,
   wherein the subset of CBGs is transmitted based at least in part on the subsequent resource allocation.

3. The wireless communication device of claim 1, wherein the receiving device comprises a destination device in a point-to-point communication between a source device and the destination device, wherein the wireless communication device comprises the source device.

4. The wireless communication device of claim 3, wherein the point-to-point communication comprises an access link communication or a sidelink communication.

5. The wireless communication device of claim 1, wherein the one or more processors are further configured to receive, from a source device, the subset of CBGs.

6. The wireless communication device of claim 5, wherein the one or more processors are further configured to decode the subset of CBGs, wherein the HARQ-ACK status message indicates that the wireless communication device decoded the subset of CBGs.

7. The wireless communication device of claim 5, wherein the one or more processors are further configured to receive, from the source device, the set of CBGs.

8. The wireless communication device of claim 5, wherein the wireless communication device comprises a relay device in a relayed communication between the source device and the receiving device, and wherein the relayed communication comprises:
   an uplink communication, wherein the source device comprises a first user equipment (UE), the relay device comprises a second UE, and the receiving device comprises a network entity;
   a sidelink support communication, wherein the source device comprises a first UE, the receiving device comprises a second UE, and the relay device comprises a network entity;
   an integrated access and backhaul (IAB) communication, wherein the source device comprises a first TAB node, the receiving device comprises a second TAB node, and the relay device comprises a third TAB node; or
   a combination thereof.

9. The wireless communication device of claim 8, wherein the relayed communication comprises the uplink communication, and wherein the identification of the subset of CBGs is carried in a physical uplink control channel transmission or a physical uplink shared channel (PUSCH) transmission.

10. The wireless communication device of claim 8, wherein the relayed communication comprises the uplink communication, and wherein the identification of the subset of CBGs is carried in uplink control information (UCI).

11. The wireless communication device of claim 10, wherein the UCI is carried in a transmission that is different than the initial data transmission.

12. The wireless communication device of claim 8, wherein the relayed communication comprises the sidelink support communication, and wherein the sidelink support communication supports a sidelink connection between the first UE and the second UE.

13. The wireless communication device of claim 1, wherein the initial data transmission comprises one or more padding bits, wherein the set of CBGs comprises a quantity of bits equal to a sum of a quantity of bits corresponding to the subset of CBGs and a quantity of the one or more padding bits.

14. The wireless communication device of claim 13, wherein a content indicated by the one or more padding bits is configured to cause a failure of at least one of:
   a code block cyclic redundancy check (CRC),
   a TB CRC, or
   a combination thereof.

15. The wireless communication device of claim 1, wherein the wireless communication device comprises a relay device in a relayed communication between a source device and a destination device, wherein the receiving device comprises the destination device, and
   wherein the one or more processors, when transmitting the subset of CBGs, are further configured to perform at least one of:

bit repetition within one or more code blocks of the subset of CBGs,
code block repetition within one or more CBGs of the subset of CBGs,
code block group (CBG) repetition within the subset of CBGs, or
a combination thereof.

16. The wireless communication device of claim 15, wherein the subset of CBGs is transmitted with a spectral efficiency that is lower than a spectral efficiency associated with transmitting the set of CBGs.

17. The wireless communication device of claim 15, wherein the one or more processors, when performing bit repetition, are configured to perform a rate-matching procedure.

18. The wireless communication device of claim 17, wherein the one or more processors, when performing the rate-matching procedure, are configured to perform the rate-matching procedure within each code block of the subset of CBGs to generate a plurality of rate-matched bits.

19. The wireless communication device of claim 18, wherein a quantity of the plurality of rate-matched bits is equal to a quantity of bits associated with the set of CBGs.

20. The wireless communication device of claim 15, wherein the one or more processors, when performing CBG repetition, are configured to:
retransmit the subset of CBGs according to a repetition pattern, wherein one or more code blocks are repeated or dropped so that a resulting pattern of code blocks per CBG corresponds to a pattern of code blocks per CBG associated with the set of CBGs.

21. The wireless communication device of claim 1, wherein the wireless communication device comprises a relay device in a relayed communication between a source device and a destination device, wherein the receiving device comprises the destination device, wherein the initial data transmission comprises a spectral efficiency that is equal to a spectral efficiency associated with a transmission of the set of CBGs.

22. The wireless communication device of claim 21, wherein a resource allocation associated with the initial data transmission comprises a quantity of resources that is fewer than a quantity of resources of a resource allocation associated with a transmission of the set of CBGs.

23. The wireless communication device of claim 22, wherein the one or more processors are further configured to:
determine a TB size (TBS) corresponding to the subset of CBGs using a TBS formula that is modified by a scaling factor.

24. The wireless communication device of claim 23, wherein the scaling factor comprises a ratio of a quantity of CBGs in the set of CBGs to a quantity of CBGs in the subset of CBGs.

25. The wireless communication device of claim 23, wherein the scaling factor is indicated by one or more parameters in downlink control information (DCI).

26. A relay device for wireless communication, comprising:
a memory; and
one or more processors coupled to the memory, the one or more processors configured to:
transmit, to a destination device, an identification of a subset of code block groups (CBGs) of a set of CBGs, wherein the set of CBGs comprises a transport block (TB), wherein the relay device is in a relayed communication between a source device and the destination device, and wherein the relayed communication comprises: an uplink communication, a sidelink support communication, an integrated access and backhaul (IAB) communication, or a combination thereof; and
transmit, to the destination device, an initial data transmission comprising the subset of CBGs.

27. The relay device of claim 26, wherein the relayed communication comprises the uplink communication, and wherein the source device comprises a first user equipment (UE) and the relay device comprises a second UE.

28. The relay device of claim 26, wherein the relayed communication comprises the sidelink support communication, and wherein the destination device comprises a user equipment and the relay device comprises a network entity.

29. The relay device of claim 26, wherein the relayed communication comprises the integrated access and backhaul (IAB) communication, and wherein the source device comprises a first IAB node, the destination device comprises a second IAB node, and the relay device comprises a third IAB node.

30. A wireless communication device for wireless communication, comprising:
a memory; and
one or more processors coupled to the memory, the one or more processors configured to:
transmit, to a receiving device, an identification of a subset of code block groups (CBGs) of a set of CBGs, wherein the set of CBGs comprises a transport block;
transmit, to the receiving device, an initial data transmission comprising the subset of CBGs, wherein the initial data transmission comprises one or more padding bits; and
transmit, to the receiving device, a code block group flush indicator (CBGFI), wherein the CBGFI is to cause a log-likelihood ratio decoder buffer of the receiving device and associated with the one or more padding bits to be erased.

* * * * *